Nov. 5, 1935.                J. M. WEED                2,020,090
                           ELECTRIC MOTOR
                       Filed Oct. 10, 1934           2 Sheets-Sheet 1
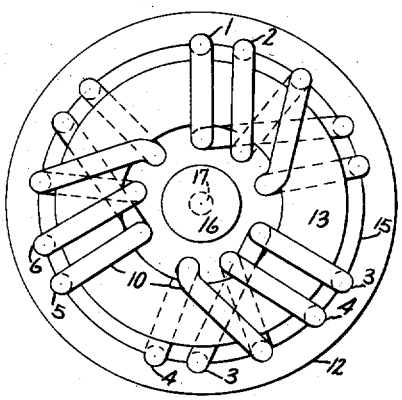
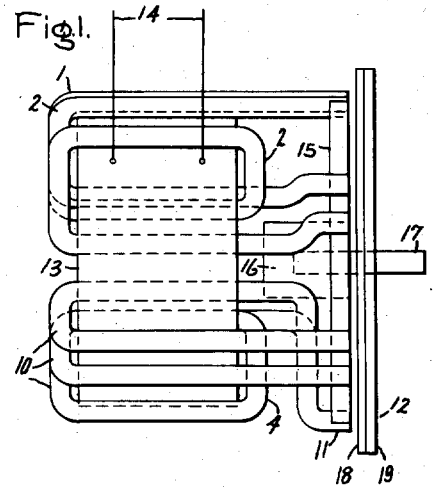
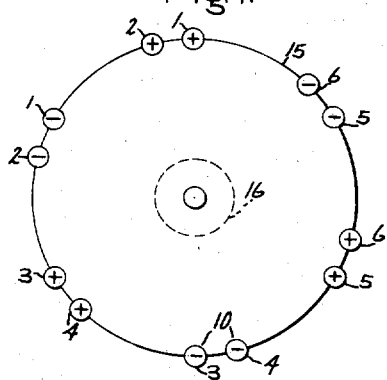
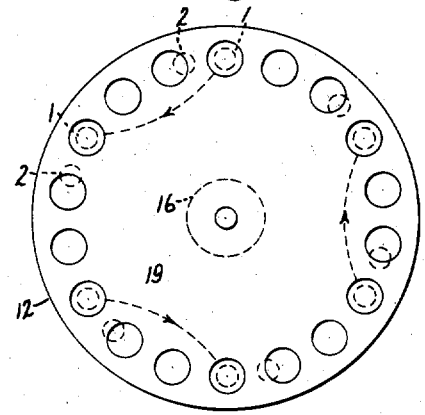
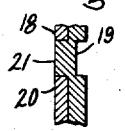
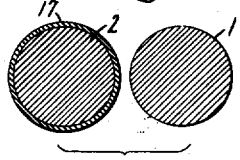
Inventor:
James M. Weed,
by Harry E. Dunham
His Attorney.

Nov. 5, 1935.  J. M. WEED  2,020,090
ELECTRIC MOTOR
Filed Oct. 10, 1934  2 Sheets-Sheet 2
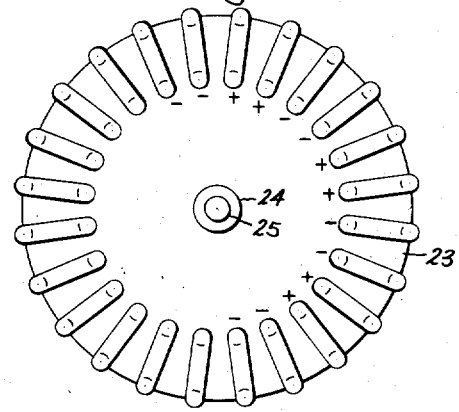
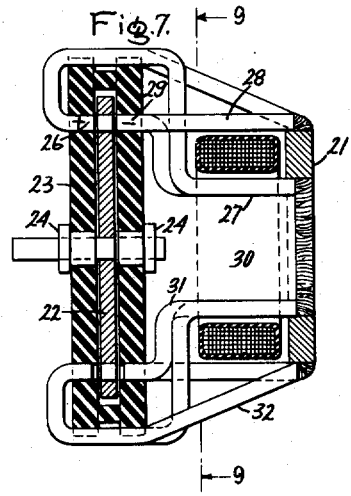
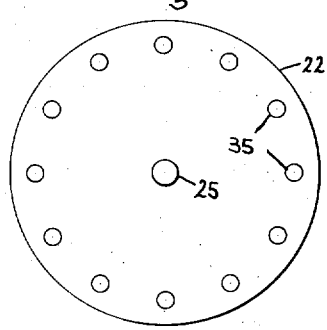
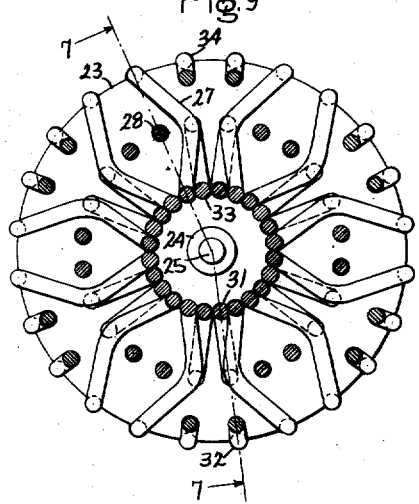
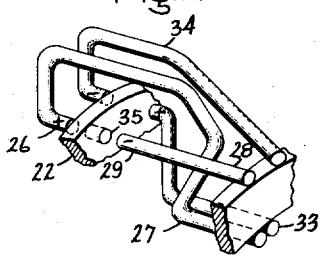
Inventor:
James M. Weed,
by Harry E. Dunham
His Attorney.

Patented Nov. 5, 1935

2,020,090

UNITED STATES PATENT OFFICE 2,020,090

ELECTRIC MOTOR

James M. Weed, Ballston Lake, N. Y., assignor to General Electric Company, a corporation of New York Application October 10, 1934, Serial No. 747,698

8 Claims. (Cl. 172—278)

My invention relates to alternating-current devices and in particular to small alternating-current motors using the shaded pole principle. The invention is particularly suited but not confined to synchronous motors such as those used for driving timing devices.

The primary object of my invention is to provide improvements in the magnetic field structure of such motors and in the flux-shading means therefor.

In carrying my invention into effect, I make the magnetic field structure of a number of magnetic wires of such size that end portions of the individual wires may be employed to form flux-emitting pole pieces for the motor. The wires, the ends of which form the shaded pole pieces for the motor, are sheathed or coated with a current-conducting material to produce the desired flux-retarding effect therein. The arrangement permits of the manufacture of reliable, light weight motors of a low cost.

The features of my invention which are believed to be novel and patentable will be pointed out in the claims appended hereto. For a better understanding of my invention, reference is made in the following description to the accompanying drawings in which Fig. 1 shows a side view of a motor built in accordance with my invention using a disc armature and having the stator pole pieces all on one side of such armature; Fig. 2 shows an end view of the motor of Fig. 1 taken from the end opposite the armature; Fig. 3 represents a view of the armature end of the motor of Fig. 1; Fig. 4 represents an end view of the armature end of such motor with the armature removed; Fig. 5 is an enlarged cross-sectional representation of the different kinds of wire used in the magnetic field structure of this motor; Fig. 6 is a sectional view of a portion of the armature showing a desirable construction thereof; Fig. 7 represents a sectional view of a motor embodying my invention having a disc armature with stator pole pieces on both sides thereof; Fig. 8 is a view of the left end of the motor of Fig. 7; Fig. 9 is a sectional view of such a motor taken on line 9—9 of Fig. 7; Fig. 10 represents a face view of the armature of this motor; and Fig. 11 is an explanatory figure illustrating more clearly the pole piece arrangement of the motor of Fig. 7.

Referring now particularly to Figs. 1 to 5 inclusive, it will be noted that the motor illustrated has an unusual form of stator magnetic circuit and pole piece arrangement in that the stator core is made up of a plurality of individual wires 10 made of iron or other suitable magnetic material bent into single or double loops with their ends 11 supported in a circular formation forming pole pieces facing the armature 12. The wires 10 are looped one or more times through a single-phase energizing coil 13 which has terminals for connection to a single-phase source of supply 14. It will be evident, therefore, that the wires will have fluxes set up lengthwise therein and that the opposite ends of a given wire will be of opposite magnetic polarity at any given instant. The ends of the wires may, therefore, be used as stator pole pieces and be readily bent into any desired polar arrangement with respect to each other and to the armature and secured in place when arranged as desired. While round wires are illustrated, the invention is not limited to this cross-sectional shape.

In the illustration, the ends of the wires are secured by being partially embedded in the periphery of a circular supporting disc 15 made of non-magnetic material, such, for example, as hard rubber or other material suitable for the purpose. The disc or plate 15 also supports a bearing 16 at its center in which the shaft 17 of the armature 12 is rotatively supported. It will be understood that, in order to illustrate clearly the novel features of the motor, I have not attempted to show all of the mechanical supporting structure that may be advisable in such a motor.

In the motor illustrated, six wires are used and for convenience are numbered from 1 to 6. The motor in question has six magnetic poles and twelve pole pieces. Wires 1, 3, and 5 are made of soft iron. Wires 2, 4, and 6 are made of soft iron and are plated with a good conducting material such as copper, tin, nickel, or aluminum. The difference between the wires is illustrated in Fig. 5 where it will be noted that wire 1 is made of one material and that wire 2 is similar, with the exception that it has a coating 17 of good conducting metal. The thickness of this coating 17 will depend upon the conductivity of the material used, but, since such skin conductor extends over the entire lengths of the wires 2, 4, and 6, it may be made very thin and be put on by an electroplating process. The thickness of sheath 17 is exaggerated in Fig. 5 for illustration purposes. It serves the purpose of a shading coil and causes the flux in the metal coated wires to lag behind the flux in the bare iron wires 1, 3, and 5 due to the currents that are induced to flow around the wires through the metal coating by the rapidly changing fluxes therethrough. Thus, it will be seen that the adjacent ends of wires 1 and 2 form a positive magnetic pole at the instant the opposite adjacent ends of these same wires form a negative magnetic pole and that the flux in wire 2 lags behind that in wire 1. In order to use a minimum length of wire and avoid unnecessary crossing of wires, the positive and negative magnetic poles formed by opposite ends of wires 1 and 2 are placed adjacent to each other about the circular polar arrangement. The pair of shaded and unshaded wires 3 and 4 and the similar pair 5 and 6 are arranged in the same manner to produce positive and negative flux-shifting poles in other sectors of the circular polar arrangement.

It is known that the effect of a shading coil or equivalent conductor about a magnetic circuit causes not only a lagging of the flux therein but also it diminishes the flux that would otherwise flow in the magnetic circuit for a given magnetizing force. To guard against an undesirable unbalance between the shaded and unshaded fluxes at the pole pieces of my motor is a simple matter and I prefer to increase the magnetizing force which causes flux to flow through the flux-shading wires 2, 4, and 6 over that which produces flux in the unshaded wires 1, 3, and 5. To this end, it will be noted that, while wires 1, 3, and 5 are looped through coil 13 once, wires 2, 4, and 6 are looped through this coil twice so that the magnetizing force for the flux-shading wires is considerably greater than for the bare wires. The relative numbers of turns about the magnetizing coil for the two sets of wires and the resistance of the shading sheath 17 will be such as to produce substantially balanced shaded and unshaded flux components having a desirably large phase angle of flux shift between them.

Owing to the fact that the shading effect is distributed over a very large proportion of the length of the shaded magnetic circuit and that this circuit is rather completely segregated from the circuit of the unshaded flux and is subject to a higher magnetizing force, it is possible to reduce materially the amount of iron needed in the magnetic circuit of the motor to obtain a satisfactory and effective torque-producing flux at the pole pieces. Wasteful flux leakage is avoided and the useful flux is concentrated where needed. The best grade of magnetic material may be selected and properly annealed.

The weight of the motor is materially reduced and the ventilation of the motor greatly facilitated by this skeleton form of stator magnetic circuit arrangement.

It will be evident that my invention is not limited to any particular spacing between the unshaded and shaded pole pieces of a magnetic pole or spacing between magnetic poles by mechanical considerations and that, therefore, I can obtain a wide variety of polar arrangements and select that best suited for the motor characteristics desired.

In case I wish to make a nonself-starting form of synchronous motor, the shaded wires 2, 4, and 6 may be omitted or replaced by unshaded wires. With the shaded pole arrangement, I may use a rotor of conducting material without salient magnetic poles to obtain an ordinary induction motor. The addition of salient magnetic poles to the rotor will provide a self-starting synchronous motor or I may use a hardened steel rotor for hysteresis motor action. In any case, the pole arrangement of the stator can easily be varied in the manufacture of the motor to provide a field best suited for the motor characteristics desired.

In Figs. 1 and 3, I have represented a rotor to obtain self-starting induction motor action and reluctance synchronous motor action when up to speed. The rotor consists of a disc 18 of conducting material, such as copper or aluminum, which faces the stator pole pieces, and a disc 19 of magnetic material separated from the stator pole pieces by the disc 18. The disc 19 thus furnishes a return path for the stator flux between magnetic poles of opposite polarity, as indicated by dotted lines in Fig. 3, and causes such flux to cut the conducting disc 18. For synchronous motor action, the disc 18 has holes 20 cut therein and the magnetic material of disc 19 is extended through such holes to form salient magnetic poles 21 flush with the outer side of the disc 18. The material of disc 19 may be forced into the openings 20 (see Fig. 6) by a suitable manufacturing operation at the same time securely fastening the two discs together. In the illustration, the rotor is provided with eighteen such pole pieces and the stator has six magnetic poles which will produce a synchronous speed of 400 revolutions per minute when the stator coil 13 is energized by 60-cycle energy.

In the motor exemplified in Figs. 7 to 11 inclusive, the wires forming the pole pieces and a substantial portion of the stator magnetic circuit are all welded to an iron or magnetic supporting plate 21 at one end, the opposite ends of the wires terminate in salient pole pieces on opposite sides of the disc armature 22, and the pole piece ends of the wires are secured in proper relation by a supporting structure of molded insulating material 23. The structure 23 also supports suitable bearings 24 at its center for the shaft 25 of the rotary armature 22.

The pole piece ends of wires of opposite polarity face each other on opposite sides of the armature disc 22 so that, except for the armature gap, there is a plurality of continuous magnetic circuits, one of which may be traced in Fig. 7 as follows:—from positive pole piece 26, wire 27 to the inner periphery of the washer shaped magnetic plate 21, radially through the plate to the outer periphery through wire 28 and to negative pole piece 29 opposite positive pole piece 26. An alternating flux is forced through these magnetic circuits by a single-phase coil 30 about and through which the magnetic circuits extend.

At the instant when pole piece 26 is positive, all other pole pieces formed by the ends of wires which likewise extend from plate 21 through coil 30 will be positive. Thus, in Fig. 7, the pole piece formed at the end of wire 31 will be positive. At the same instant, all pole pieces formed by the ends of wires coming from plate 21 outside coil 30 will be negative. Thus, the pole piece at the end of wire 32 is negative at this instant. As the current in coil 30 reverses, the polarities of all of the pole pieces will reverse. Half of the wires coming through coil 30 are sheathed as explained in connection with Fig. 4 and half of the wires extending outside coil 30 are similarly plated with a conducting material so that the fluxes in these shaded wires will be retarded with respect to the fluxes in the remaining unshaded wires. A pair, consisting of shaded and unshaded wire ends of one polarity, form a shaded magnetic pole on one side of the disc armature, and a similar pair of wire ends of opposite polarity facing the first mentioned pair on the opposite side of the disc forms a complementary shaded pole of opposite polarity. The shaded wire ends are, of course, opposite each other and comprise the trailing pole piece of such shaded magnetic poles. In Fig. 9, where the wires are represented in cross-section, the heavier circles represent the shaded wires. Thus, wires 27 and 28 are shaded and their pole ends form the trailing pole portions of complementary magnetic poles of opposite polarity on opposite sides of the armature while wires 33 and 34 are unshaded and their pole ends form leading pole portions of complementary magnetic poles of opposite polarity on opposite sides of the armature.

The manner in which the wires may be bent and assembled in proper relation and to avoid high magnetic leakage between wires of opposite polarity and maintain the different wire magnetic circuits of the same length for proper magnetic balance will be clear from Figs. 7, 8, 9, and 11 but I do not limit my invention to the particular style of assembly illustrated. It will appear then that four wire ends or pole tips consisting of a pair of positive shaded and unshaded wire ends on one side of the armature and a complementary pair of negative shaded and unshaded wire ends on the opposite side which face the first mentioned pair may be considered to form a complete shaded magnetic pole for the motor for the purpose of computing speed by the usual formula. In the motor illustrated, there are twelve such complete magnetic poles, each consisting of two unshaded and two shaded wire ends.

Fig. 11 represents the trailing pole portion consisting of shaded pole tips 26 and 29 of one such pole and the leading pole portion of the next consecutive pole of opposite polarity formed by the ends of unshaded wires 33 and 34. The armature illustrated consists of a disc 22 of conducting material, such as copper, through which twelve evenly spaced magnetic pins 35 have been inserted. These pins are on the same radius as the stator pole pieces. Such a motor will start with induction motor torque and pull into synchronism at a twelve-pole speed or 600 revolutions per minute when the coil 30 is energized with 60-cycle alternating current. At such speed, the iron pins in the rotor disc will move at an average speed to intercept the shaded and unshaded flux pulsations passing between opposite pole tips in a synchronous relation and act as a magnetic link between poles of opposite polarity on opposite sides of the armature and thus travel forward with the rotating magnetic field.

Reduced or subsynchronous speed can be obtained by increasing the number and decreasing the spacing between the magnetic inserts 35 in the armature in accordance with the principles disclosed in United States patent to Hall, No. 1,668,365, May 1, 1928.

It will be noted that the spacing between shaded and unshaded pole tips of the same magnetic pole has been made the same as the spacing between shaded and unshaded pole tips of adjacent magnetic poles or equal to one-half the spacing between different magnetic poles of the motor. While I do not wish my invention to be limited to this particular spacing, a wide spacing between shaded and unshaded pole tips of the same magnetic pole is advantageous in this form of motor when full synchronous speed operation is desired as in the example given above. Torque for starting the motor and bringing it up to the synchronous speed is produced by eddy currents set up in the rotor. With a uniformly rotating field, the torque produced by eddy currents falls away and approaches zero as the rotor approaches full synchronous speed so that, with the number of magnetic inserts 35 in the rotor equal to the number of magnetic poles in the stator, there is doubt of their ability to pull into synchronism. However, in a single-phase motor with the shaded and unshaded pole pieces uniformly spaced as in the illustration, the field does not rotate at a uniform speed. This is due to the fact that the shaded pole pieces are spaced 90 electrical degrees from the unshaded pole pieces of the same magnetic pole while the flux lag therein is of the order of 45 electrical degrees behind the flux in the same unshaded pole pieces. The rotating field, therefore, advances from unshaded to shaded pole portions of the same magnetic pole in one-third of the time required to advance from a shaded pole piece to the next unshaded pole piece of opposite polarity while the synchronous speed for the inserts is the average of the two speeds involved. Eddy current torque produced by the more rapid advance of the field from unshaded to shaded pole pieces of the same polarity will be sufficient to help the magnetic inserts into synchronism with the average rate of advance.

If it is desired to compensate the motor of Figs. 7 to 11 for the tendency of the flux in the shaded wires to be less than that in the unshaded wires, it may be accomplished by making the air gaps for the unshaded pole pieces adjacent the armature slightly greater than the air gaps for the shaded poles. Thus, in Fig. 7, the ends of unshaded wires 31 and 32 are cut back slightly in comparison to the ends of shaded wires 27 and 28 at the point where these ends face the armature. The slightly greater air gap in the magnetic circuits of the unshaded wires may thus be used to equalize and balance the fluxes as desired in the shaded and unshaded portions of the magnetic poles. The same expedient may be used in either form of motor disclosed to balance the fluxes at different pole pieces where, due to the manner of bending the wires into the desired positions, a proper flux balance is not otherwise obtained.

What I claim as new and desire to secure by Letters Patent of the United States is:

1. An alternating-current motor of the shaded pole type in which the stator magnetic circuit includes wires of magnetic material, the ends of which form pole pieces for the motor, a portion only of such wires being coated throughout their lengths with a current-conducting material to cause the flux therein to lag behind the flux in the remaining wires, end portions of such coated and uncoated wires serving to produce a shaded magnetic pole.

2. In an alternating-current motor, means for producing a shifting magnetic field therein comprising two pieces of wire of magnetic material, only one of which is coated with a current-conducting material throughout its length, and a single-phase coil for producing alternating fluxes lengthwise through said wires, said wires having flux emitting end portions secured adjacent to each other.

3. In an alternating-current motor device, means for producing a shifting magnetic field therein comprising two wires of magnetic material, only one of which is coated throughout its length with a current-conducting material, and a single-phase coil for producing alternating fluxes lengthwise of said wires, said wires having end portions forming flux pole pieces of the same magnetic polarity secured adjacent to each other.

4. An alternating-current shaded pole motor comprising cooperating stator and rotor parts, the stator part having a magnetic circuit, a substantial portion of which is made of iron wires, end portions of which form the motor pole pieces adjacent the rotor, those wires the end portions of which form the shaded portions of the motor pole pieces being coated with a conducting material throughout their lengths, and a single-phase coil for producing alternating fluxes lengthwise through all of said wires.

5. An alternating-current motor of the shaded pole type having relatively rotatable members, one of said members being formed of a plurality of magnetic wires, the end portions of which form salient pole pieces of such member, said wires being sufficiently spaced apart to avoid excessive magnetic leakage between them and only a portion of said wires being coated throughout their lengths with a thin layer of conducting material to cause a lag in the flux therethrough, and a single-phase coil for producing fluxes through all of said wires and causing opposite ends of each wire to be magnetized with opposite magnetic polarities at any given instant, pairs of coated and uncoated wire ends of the same polarity being grouped adjacent each other to produce the effect of shaded magnetic poles.

6. An alternating-current motor of the shaded pole type having relatively rotatable primary and secondary members, the primary member comprising a single-phase energizing coil and a plurality of wires of magnetic material threaded through said coil, said wires forming the magnetic field structure of said member and end portions of said wires forming salient poles thereof, a portion only of said wires being coated with a conducting material to cause the flux therethrough to lag behind the flux in the remaining wires and said coated wires being threaded through said coil a greater number of times than the remaining wires, the end portions of said wires being assembled in pairs to produce a series of magnetic poles of alternating polarity, each such magnetic pole being produced by adjacent coated and uncoated wire ends of the same magnetic polarity.

7. An alternating-current motor having a disc rotor and a salient pole stator, said stator having a single-phase energizing coil coaxial with said rotor on one side thereof and a magnetic field structure magnetized by said coil consisting of a plurality of magnetic wires extending through and around said coil with their end portions bent into position to form salient pole pieces symmetrically spaced about the periphery of said disc rotor.

8. An alternating-current motor comprising cooperating stator and rotor elements, said stator element comprising a washer-shaped magnetic plate having an equal number of magnetic wires secured thereto at the inner and outer peripheries and extending approximately axially therefrom in one direction, a single-phase energizing coil coaxial with said plate through which the wires secured to the inner periphery of said plate extend and about which the remaining wires extend, the extending ends of said wires being bent to have their ends spaced apart and facing each other in two circular groups of salient pole pieces, the end of a wire which extends through said coil being opposite the end of a wire which extends around said coil, the rotor of the motor extending between and coaxial with the two circular groups of salient pole pieces thus formed so as to be cut by the fluxes forced through said wires by said energizing coil, half of the wires extending through said coil and half of the wires extending about said coil being coated with a conducting metal to produce a flux lag in the wires thus coated, the ends of the coated and uncoated wires extending from within and about said coil being grouped in pairs on opposite sides of said rotor to produce a rotating magnetic field therethrough.

JAMES M. WEED.